(12) United States Patent
Sheridan et al.

(10) Patent No.: US 8,246,503 B2
(45) Date of Patent: Aug. 21, 2012

(54) EPICYCLIC GEAR SYSTEM WITH IMPROVED LUBRICATION SYSTEM

(75) Inventors: William G. Sheridan, Southington, CT (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 519 days.

(21) Appl. No.: 12/482,053

(22) Filed: Jun. 10, 2009

(65) Prior Publication Data

US 2010/0317477 A1    Dec. 16, 2010

(51) Int. Cl.
*F16H 57/04*    (2010.01)
*F16H 57/08*    (2006.01)

(52) U.S. Cl. .......... 475/159; 475/331; 184/6.12

(58) Field of Classification Search ........... 475/159, 475/160, 331, 334, 348; 74/467; 184/6.12, 184/6.24; 384/322, 372
See application file for complete search history.

(56) References Cited

U.S. PATENT DOCUMENTS

| | | | |
|---|---|---|---|
| 3,539,035 A * | 11/1970 | Wolkenstein | 184/6.12 |
| 5,102,379 A | 4/1992 | Pagluica et al. | |
| 5,391,125 A * | 2/1995 | Turra et al. | 475/346 |
| 5,433,674 A | 7/1995 | Sheridan et al. | |
| 6,223,616 B1 | 5/2001 | Sheridan | |
| 6,964,155 B2 | 11/2005 | McCune et al. | |
| 7,021,042 B2 | 4/2006 | Law | |
| 2005/0075211 A1 * | 4/2005 | Fox et al. | 475/348 |
| 2007/0225111 A1 | 9/2007 | Duong et al. | |
| 2008/0116010 A1 | 5/2008 | Portlock et al. | |

FOREIGN PATENT DOCUMENTS

| | | |
|---|---|---|
| EP | 1890054 | 2/2008 |
| EP | 1925856 | 5/2008 |
| FR | 1357038 | 2/1964 |

OTHER PUBLICATIONS

European Search Report, Sep. 17, 2010, 8 pages.

* cited by examiner

*Primary Examiner* — Roger Pang
(74) *Attorney, Agent, or Firm* — Kinney & Lange, P.A.

(57) ABSTRACT

A journal bearing that includes a central body having first and second passageways and a filter. The central body extends axially and is adapted to be supported at each outer end. The first passageway extends generally axially through a portion of the central body. The filter is disposed in the first passageway and is configured to trap debris from a lubricant fluid flowing therethrough. The second passageway extends between both the first passageway and an exterior surface of the central body to allow for delivery of lubricant fluid thereto.

11 Claims, 3 Drawing Sheets

EPICYCLIC GEAR SYSTEM WITH IMPROVED LUBRICATION SYSTEM

BACKGROUND

The present invention relates to gas turbine engines, and more particularly, to an epicyclic gear system for use in gas turbine engines.

Epicyclic gear trains are complex mechanisms for reducing or increasing the rotational speed between two rotating shafts or rotors. The compactness of planetary or star system gear trains makes them appealing for use in aircraft engines.

The forces and torque transferred through an epicyclic gear train place tremendous stresses on the gear train components, making them susceptible to breakage and wear. For example, the longitudinal axes of an epicyclic gear train's sun gear, star gear, and ring gear are ideally parallel with the longitudinal axis of an external shaft that rotates the sun gear. Unfortunately, many components of epicyclic gear trains, particularly an internal journal bearing within each star gear, are difficult to install and to effectively align. Additionally, because a perfect alignment is rare due to numerous factors (including imbalances in rotating hardware, manufacturing imperfections, and transient flexure of shafts and support frames due to aircraft maneuvers), it is necessary to have a proper amount of lubrication (i.e. an adequate film thickness) between each internal journal bearing and each star gear. Proper lubrication is necessary because misalignment (both parallel and angular) imposes moments and forces on the internal journal bearing which will cause it to contact and wear on the star gear it is disposed in. Unfortunately, to deliver adequate lubrication between each journal bearing and corresponding star gear, many prior art epicyclic gear trains require multiple parts which also require lubrication and are themselves susceptible to wear.

SUMMARY

According to the present invention, a journal bearing includes a central body having first and second passageways and a filter. The central body extends axially and is adapted to be supported at each outer end. The first passageway extends generally axially through a portion of the central body. The filter is disposed in the first passageway and is configured to trap debris from a lubricant fluid flowing therethrough. The second passageway extends between both the first passageway and an exterior surface of the central body to allow for delivery of lubricant fluid thereto.

DETAILED DESCRIPTION

The present application describes an epicyclic gear system with a minimum number of internal passageways and components which allow an adequate amount of lubricating liquid to reach the journal bearings of the epicyclic gear system in a gas turbine engine. The configuration of the internal passageways also allows for effective filtration of the lubricant within each journal bearing immediately adjacent to the bearing/star interface surface. Additionally, each journal bearing is provided with an alignment pin which allows for more effective installation of the journal bearing with respect to the star gear. The alignment pin helps to ensure proper angular orientation of the passageways delivering lubricant such that an adequate film thickness is achieved to react load between the journal bearing and the star gear in a load zone.

Figure 1:
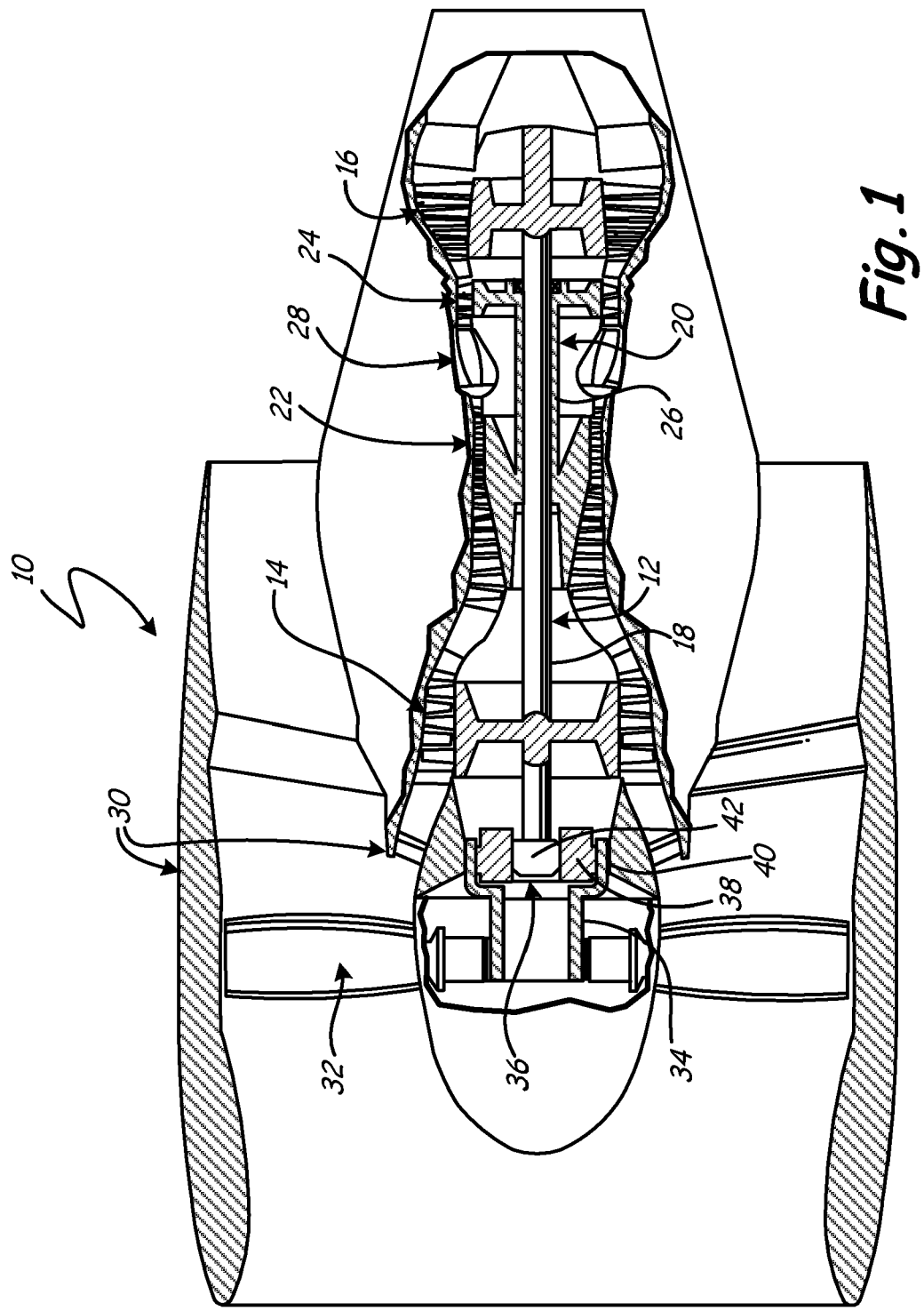
FIG. 1 is a schematic cross-sectional side view of a gas turbine engine with an epicyclic gear system.

FIG. 1 is a schematic cross-sectional side view of gas turbine engine 10. Gas turbine engine 10 includes low pressure unit or spool 12 (which includes low pressure compressor 14 and low pressure turbine 16 connected by low pressure shaft 18), high pressure unit or spool 20 (which includes high pressure compressor 22 and high pressure turbine 24 connected by high pressure shaft 26), combustor 28, nacelle 30, fan 32, fan shaft 34, and epicyclic gear system 36. The epicycle gear system 36 includes star gear 38, ring gear 40, and sun gear 42. The general construction and operation of gas turbine engines is well-known in the art.

As shown in FIG. 1, low pressure unit 12 is coupled to fan shaft 34 via epicyclic gear system 36. Sun gear 42 is attached to and rotates with low pressure shaft 18. Sun gear 42 is rotatably mounted the low pressure shaft 18. Ring gear 40 is connected to fan shaft 34 which turns at the same speed as fan 32. Star gear 38 is enmeshed between sun gear 42 and ring gear 40 such that star gear 38 rotates when sun gear 42 rotates. Star gear 38 is rotatably mounted on the stationary gear carrier (not shown) by stationary journal bearing (not shown). When low pressure unit 12 rotates, epicyclic gear system 36 causes fan shaft 34 to rotate at a slower rotational velocity than that of low pressure unit 12, but in the opposite direction.

In an alternative embodiment to the embodiment shown in FIG. 1, epicyclic gear system 36 can be configured in a different manner sometimes called a planetary gear system. In this alternative configuration, star or "planet" gear 38 are rotatably mounted on the gear carrier by bearings. Star gear 38 meshes with sun gear 42. Mechanically grounded, internally toothed ring gear 40 circumscribes and meshes with star gear 38. Input and output shafts extend from sun gear 42 and the gear carrier respectively. During operation, the input shaft rotatably drives sun gear 42, rotating star gear 38 about its own axis, and because ring gear 40 is mechanically grounded, causes star gear 38 to orbit sun gear 42 in the manner of a planet. Orbital motion of star gear 38 turns the gear carrier and the output shaft in the same direction as the input shaft, but slower.

Figure 2:
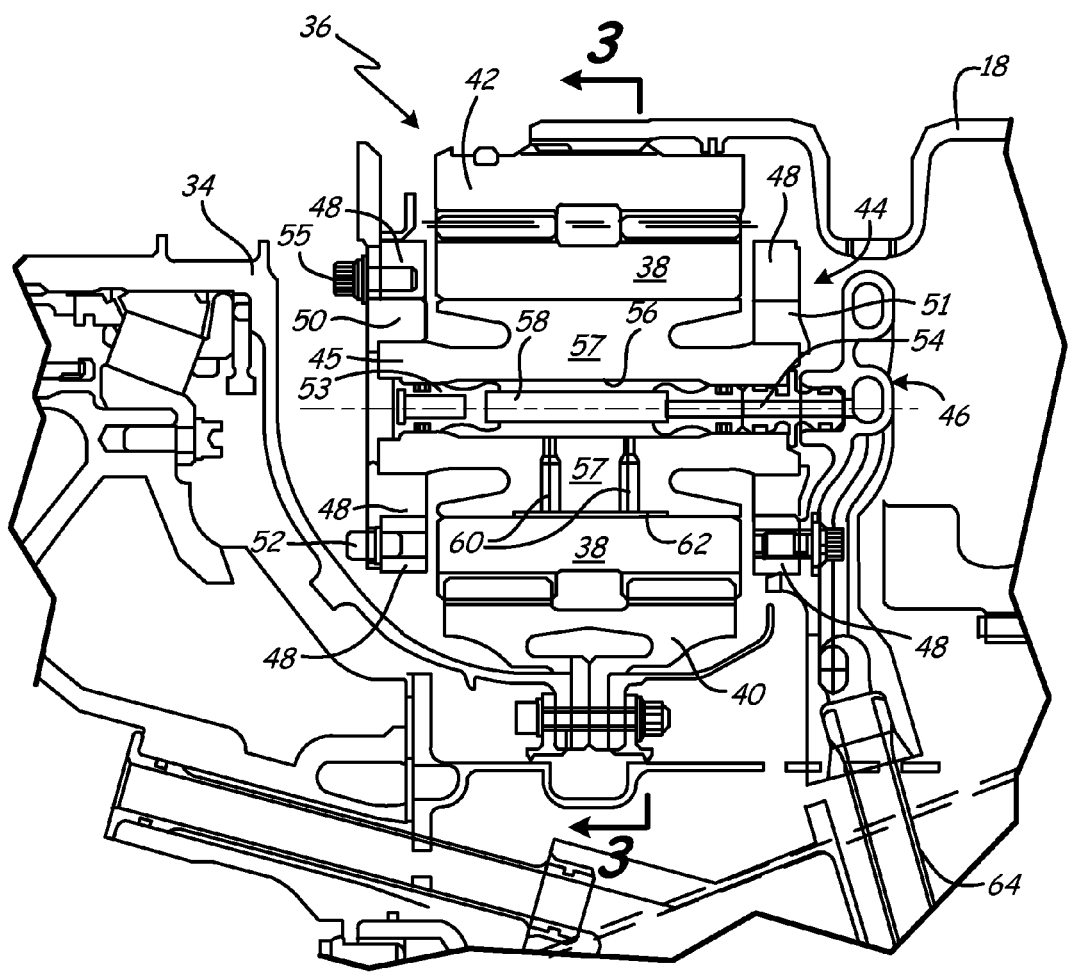
FIG. 2 is a schematic cross-sectional view of the epicyclic gear system of FIG. 1.

FIG. 2 is a cross-sectional view of epicyclic gear system 36 taken through only a single star gear 38. Epicyclic gear system 36, however, includes multiple star gears arranged circumferentially around the sun gear 42. In addition to star gear 38, ring gear 40, and sun gear 42, epicyclic gear system 36 includes journal bearing subassembly 44, lubricant manifold 46, carrier 48, end caps 50 and 51, alignment pin 52 and bolt 55. In addition to end caps 50 and 51, journal bearing subassembly 44 includes central pin 53, axial passage 54, cavity 56, central body pin 57, filter 58 and radial passages 60. Radial passages 60 fluidly connect to distribution recess 62. Lubricant manifold 46 includes fittings 64 and is connected to feed tube 66.

As discussed previously, in one embodiment, low pressure unit 12 (FIG. 1) is coupled to fan shaft 34 via epicyclic gear system 36. Sun gear 42 is attached to and rotates with low pressure shaft 18 (FIG. 1). Sun gear 42 is rotatably mounted on low pressure shaft 18. Carrier 48 is stationarily mounted within gas turbine engine 10 (FIG. 1) to the non-rotating engine case walls radially outboard of epicyclic gear system 36. Carrier 48 has two generally interfacing faces which support the ends of the stationary journal bearing subassembly 44. Ring gear 40 is connected to fan shaft 34 (FIG. 1) which turns at the same speed as fan 32 (FIG. 1). Star gear 38 (only one is illustrated although epicyclic gear system 36 includes a set of multiple star gears) is enmeshed between sun gear 42 and ring gear 40 such that star gear 38 rotates when sun gear 42 rotates. Star gear 38 is rotatably mounted on the stationary carrier 48 by journal bearing subassembly 44.

When low pressure unit 12 rotates, epicyclic gear system 36 causes fan shaft 34 to rotate at a slower rotational velocity than that of low pressure unit 12. The operation of similar epicyclic gear systems and lubrication systems for epicycle gear systems are further detailed in U.S. Pat. Nos. 6,223,616 and 5,102,379, which are herein incorporated by reference.

In the embodiment shown in FIG. 2, stator journal bearing subassembly 44 is positioned inside of rotatable star gear 38. Lubricant manifold 46 is disposed adjacent to journal bearing subassembly 44 and is fluidically connected thereto. Star gear 38 is rotatably mounted on carrier 48 by journal bearing subassembly 44. End caps 50 and 51 of journal bearing subassembly 44 are welded to ends of central body pin 57. End cap 50 has a flange with holes in it for accepting alignment pin 52 and bolt 55 such that journal bearing subassembly 44 can be securely attached and aligned with apertures in carrier 48. End cap 51 is configured without a flange so that it fits through an aperture in carrier 48 making generally radial contact with the carrier 48 and the central body pin 57. End caps 50 and 51 are welded or otherwise affixed to journal bearing subassembly 44. End caps 50 and 51 provide support for journal bearing subassembly 44. In one embodiment, end caps 50 and 51 are electron beam welded to the ends of central body pin 57 and are press fit into carrier 48. Alignment pin 52 is fitted into carrier 48 and extends through end cap 50. Bolt 55 secures journal bearing subassembly 44 to carrier 48. As discussed subsequently with respect to FIG. 3, a plurality of end caps 50 and alignment pins 52 are anti-rotated to align radial passages 60 relative to carrier 48 to ensure proper lubrication distribution between journal bearing subassembly 44 and star gear 38 and to keep journal bearing subassembly 44 from rotating under extreme loads such as those that occur during a touchdown event.

Central pin 53 and fitting 64 define axial passage 54 which is fluidly connected to lubricant manifold 46. Lubricant manifold 46 is fed pressurized lubricant from other components of the gas turbine engine via feed tube 66. Liquid lubricant from lubricant manifold 46 is supplied through axial passage 54 to cavity 56. Cavity 56 houses filter 58. In one embodiment, filter 58 is constructed of wire mesh with stainless steel screen and is rated to trap particulates or debris larger than about 45 microns (.0018 inches) in diameter. Filter 58 is inserted within cavity 56 and is held in place by means of a snap ring which presses into grooves or other features in the walls of the cavity 56. The close proximity of filter 58 to the surface of journal bearing subassembly 44 allows filter 58 to more effectively trap particulates or debris in the lubricant before the lubricant passes to the surface of bearing 44 (an area of high heat and friction). Filter 58 is an important feature to trap debris since journal bearing subassembly 44 is not tolerant of contamination due to the extremely thin lubricant film it employs during operational load.

After being filtered, the lubricant flows through radial passages 60 into distribution recess 62 between journal bearing subassembly 44 and star gear 38. In one embodiment, distribution recess 62 extends in an arch along about 30° of the exterior surface of journal bearing subassembly 44. The lubricating liquid forms a film of lubrication on journal bearing subassembly 44 in the distribution recess 62. From distribution recess 62 the film of lubrication spreads circumferentially and axially due to viscous forces between star gear 38 and journal bearing subassembly 44. The lubricant film helps to support star gear 38 and reduce friction between the interior surface of star gear 38 and the exterior surface of journal bearing subassembly 44 as star gear 38 rotates. To ensure adequate thickness of the lubricant film, the rate the lubricant is fed to the external surface of the journal bearing subassembly 44 varies and is determined by the pressure profile and temperature at the interface between star gears 38 and journal bearings subassembly 44. In one embodiment, the flow rate of the lubricant provides the external surface of journal bearing subassembly 44 with a minimum lubricant film thickness of between about 0.013 mm (500 micro inches) and 0.051 mm (2000 micro inches) in the load zone (defined subsequently).

Figure 3:
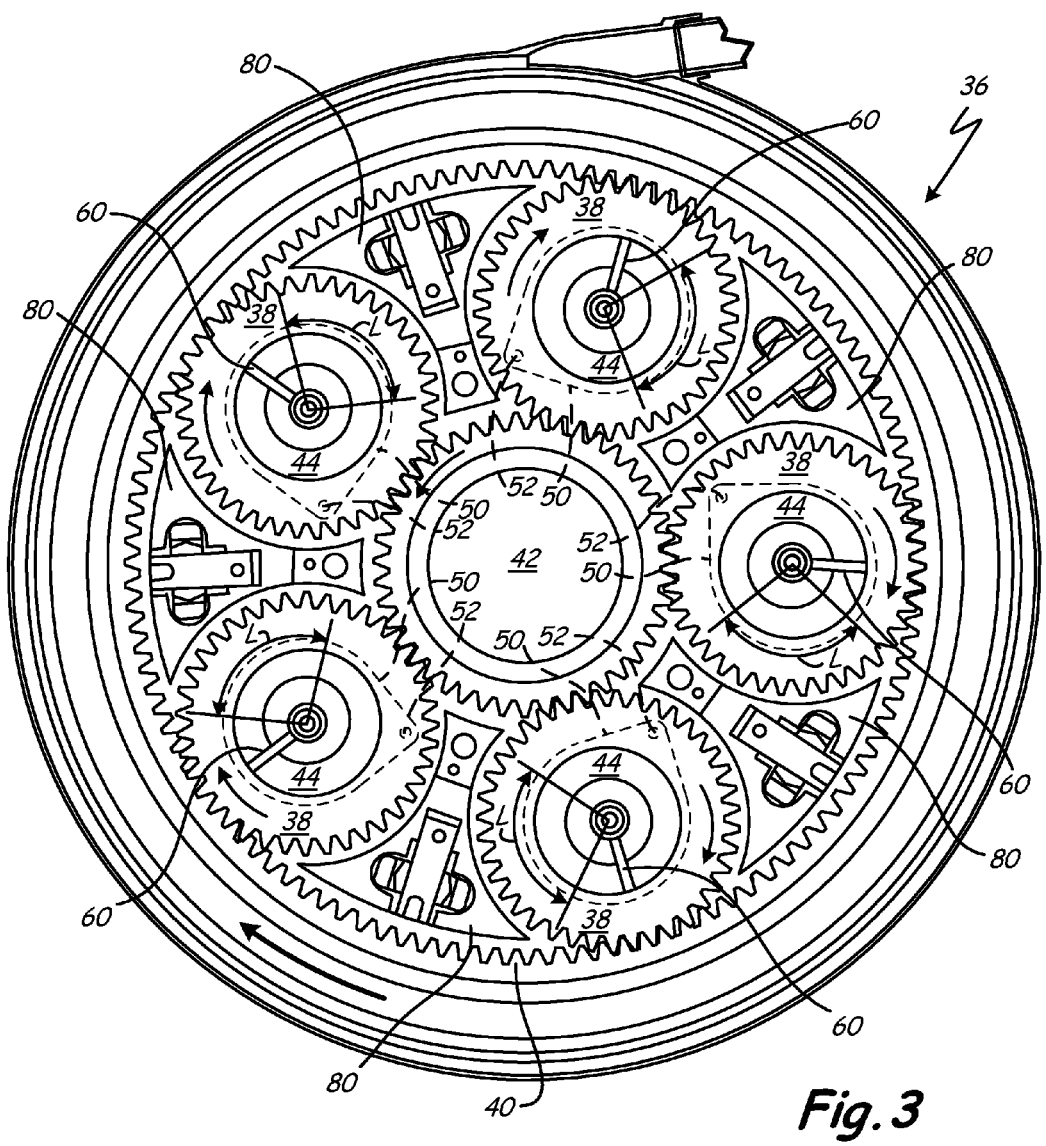
FIG. 3 is a diagrammatic view of the entire epicyclic gear system taken along line 3-3 of FIG. 2.

FIG. 3 shows a schematic view of the entire epicyclic gear system 36 taken along section 3-3 of FIG. 2. Because FIG. 3 shows the entire epicycle gear system 36 a plurality of star gears 38 are illustrated. These star gears 38 are mounted on carrier 48 by a plurality of journal bearing subassemblies 44. In FIG. 3, end caps 50 and alignment pins 52 are shown in phantom because they would not be visible to the viewer along section 3-3 of FIG. 2. In addition to the components previously discussed, the epicyclic gear system 36 includes baffles or spray bars 68.

As discussed previously with reference to FIG. 2, lubricant introduced into the journal bearing/star gear interface spreads axially and circumferentially to form a load supporting lubricant film between journal bearing subassembly 44 outer surface and star gear 38 inner surface. Each journal bearing subassembly 44 is connected to end caps 50 and 51 by welding. Alignment pins 52 extend through end caps 50 and connect to carrier 48 (not shown) to act as an anti-rotation feature to keep the assembly from spinning within carrier 48 due to the additional forces epicyclic gear assembly 36 experiences during touchdown or a bird strike. Touchdown/landing or a bird strike exerts extreme forces that can interfere with the spread of lubricant film between the journal bearing subassembly 44 and star gear 38. Each alignment pin 52 also acts as a locator device by statically affixing the corresponding journal bearing subassembly 44 to a particular location of the carrier 48. By fixing the angular orientation of each journal bearing subassembly 44 with respect to carrier 48, each journal radial passage 60 is held in a fixed location with respect to rotating star gear 38, ring gear 40, and sun gear 42, thereby ensuring that radial passages 60 of each journal bearing subassembly 44 are angularly aligned to bearing load. Load zone L (an area of most critical bearing load) is identified using finite element analysis as the region between journal bearing subassembly 44 and star gear 38 requiring at least a minimum lubricant film to react load and avoid excessive friction and wear. Thus, proper angular alignment of radial passages 60 relative to load zone L provides time for lubricant film to spread (in both the axial and circumferential directions) between journal bearing subassembly 44 outer surface and star gear 38 inner surface as star gear 38 rotates relative to stator journal bearing subassembly 44. Thus, by the time lubricant film has reached load zone L it has achieved a thickness sufficient to react load and avoid excessive friction and wear. In the embodiment shown, proper angular alignment of the radial passages 60 is achieved by positioning the radial passages 60 outside of load zone L. In this embodiment, if radial passages 60 were extended along their radial paths the centerline of the radial passages 60 would intersect with the point of tangential contact between the ring gear 40 and star gear 38.

After forming a film between journal bearing subassembly 44 and star gear 38, lubricant is discharged from the axial extremities of the bearing interface. Substantially all of the discharged lubricant is directed into the sun/star mesh, partly because of the presence of the nearby baffle 68. The directed lubricant cools and lubricates the sun and star gear teeth and then is expelled from the sun/star mesh. The adjacent baffle 68 then guides substantially all of the expelled lubricant radially outwardly into the star/ring mesh. The lubricant is then ejected from the star/ring mesh and centrifugally channeled away from the epicyclic gear system 36.

It will be recognized that the present invention provides numerous benefits and advantages. For example, placing filter 58 within each journal bearing subassembly 44 allows filter 58 to act as a last chance screen to trap debris since journal bearings subassembly 44 are not tolerant of contamination due to the extremely thin lubricant film they employ during operational load. Similarly, alignment pin 52 ensures proper angular alignment of radial passages 60 by statically affixing journal bearing subassembly 44 to a particular location in the carrier 48. By affixing each journal bearing subassembly 44 to carrier 48, each journal bearing subassembly 44 is held in a fixed location with respect to rotating star gear 38, ring gear 40, and sun gear 42, thereby ensuring that radial passages 60 of each journal bearing subassembly 44 are angularly aligned to bearing load such that adequate lubricant film can spread axially and circumferentially between journal bearing subassembly 44 outer surface and star gear 38 inner surface in critical load zone L. These features, and others, reduce epicyclic gear system wear thereby prolonging service life of the system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An epicyclic gear assembly, comprising:
an assembly having a ring gear, sun gear, and a plurality of star gears enmeshed between the ring gear and sun gear;
a carrier disposed adjacent the rotatable sun gear and star gears;
a journal bearing disposed within each star gear and connected to the carrier, the journal bearing having an interior cavity with a passageway extending radially therefrom to an external surface of the journal bearing;
a filter disposed in the cavity and configured to trap debris in a lubricant fluid prior to flow of the lubricant fluid through the passageway to the external surface of the journal bearing;
an end cap connected to the carrier and welded to the journal bearing; and
an alignment pin that extends through the end cap and into the carrier and thereby angularly aligns the passageway in a single pre-ascertained position with respect to the star gear, ring gear, and sun gear;
wherein, the passageway is angularly aligned with respect to a peak bearing load zone that occurs due to the torque and loads applied to the journal bearing and the star gear as a result of the rotatable enmeshing of the star gear with the sun gear and the ring gear, the alignment of the passageway ensures minimal distribution of lubricant film along the exterior surface of the journal bearing in an area of peak bearing load zone.

2. The assembly of claim 1, wherein the filter is constructed of wire mesh and is rated to trap debris larger than about 45 microns (0.0018 inches) in diameter.

3. The assembly of claim 1, wherein the exterior surface has a lubrication recess that communicates with the passageway and extends in an arch along about 30° of the exterior surface.

4. An epicyclic gear assembly, comprising:
an assembly having a ring gear, sun gear, and a plurality of star gears enmeshed between the ring gear and sun gear;
a carrier disposed adjacent the rotatable sun gear and star gears;
a journal bearing disposed within each star gear and connected to the carrier, the journal bearing having an interior cavity with a passageway extending radially therefrom to an external surface of the journal bearing;
an end cap connected to the carrier and welded to the journal bearing; and
an alignment pin that extends through the end cap and into the carrier and thereby angularly aligns the passageway in a single pre-ascertained position with respect to the star gear, ring gear, and sun gear;
wherein, the passageway is angularly aligned with respect to a peak bearing load zone that occurs due to the torque and loads applied to the journal bearing and the star gear as a result of the rotatable enmeshing of the star gear with the sun gear and the ring gear, the alignment of the passageway ensures minimal distribution of lubricant film along the exterior surface of the journal bearing in an area of peak bearing load zone.

5. The assembly of claim 4, further comprising a filter disposed in the cavity and configured to trap debris in a lubricant fluid prior to flow of the lubricant fluid through the passageway to the external surface of the journal bearing.

6. The assembly of claim 5, wherein the filter is constructed of wire mesh and is rated to trap debris larger than about 45 microns (0.0018 inches) in diameter.

7. An epicyclic gear assembly, comprising:
an assembly having a ring gear, sun gear, and a plurality of star gears enmeshed between the ring gear and sun gear;
a carrier disposed adjacent the rotatable sun gear and star gears;
a journal bearing disposed within each star gear and connected to the carrier, the journal bearing having an interior cavity with a passageway extending radially therefrom to an external surface of the journal bearing;
an end cap connected to the carrier and connected to the journal bearing; and
an alignment pin that extends through the end cap and into the carrier and thereby angularly aligns the passageway in a single pre-ascertained position with respect to the star gear, ring gear, and sun gear.

8. The assembly of claim 7, further comprising a filter disposed in the cavity and configured to trap debris in a lubricant fluid prior to flow of the lubricant fluid through the passageway to the external surface of the journal bearing.

9. The assembly of claim 8, wherein the filter is constructed of wire mesh and is rated to trap debris larger than about 45 microns (0.0018 inches) in diameter.

10. The assembly of claim 7, wherein the end cap is welded to the journal bearing.

11. The assembly of claim 7, wherein the passageway is angularly aligned with respect to a peak bearing load zone that occurs due to the torque and loads applied to the journal bearing and the star gear as a result of the rotatable enmeshing of the star gear with the sun gear and the ring gear, the alignment of the passageway ensures minimal distribution of lubricant film along the exterior surface of the journal bearing in an area of peak bearing load zone.

* * * * *